May 2, 1967 V. E. TERP 3,317,845

MEANS FOR TIME COMPRESSING A NARROW-BAND LOW-LEVEL SIGNAL

Filed Dec. 21, 1964

INVENTOR.
VERNON E. TERP

BY

ATTORNEYS 3,317,845

MEANS FOR TIME COMPRESSING A NARROW-BAND LOW-LEVEL SIGNAL

Vernon E. Terp, San Diego, Calif., assignor to the United States of America as represented by the Secretary of the Navy Filed Dec. 21, 1964, Ser. No. 420,223
2 Claims. (Cl. 328—165)

The invention described herein may be manufactured and used by or for the Government of the United States of America for governmental purposes without the payment of any royalties thereon or therefor.

The present invention relates to an equipment for use with matched filters and more particularly to a side lobe suppressor for suppressing the side lobes ordinarily incident when utilizing matched filter techniques.

In conventional radar equipment, for instance where cross-correlation and autocorrelation techniques are utilized, unless an optimum code is used in the equipment there are ordinarily side lobes accompanying the characteristic response of the matched filter involved. This is particularly bothersome when the incoming information is to be displayed on, for instance, a radar display in that when an optimum code is not being used side lobes are always present.

The problem arises due to the fact that the incoming information comprises a series of pulses which correspond to long time narrow-band information. The matched filter receives the pulse information and acts as a compressor to provide short-time wideband information. However, unless optimum coding is utilized there will be characteristic side lobes which accompany the main lobe which degrade the resolution on a radar display.

An object of the present invention is to provide an improved side lobe suppressor.

A further object of the present invention is to provide a side lobe suppressor for use with cross-correlation and auto-correlation techniques for removing side lobes ordinarily incident to the characteristic response of the matched filter when optimum coding is not utilized.

An additional object of the present invention is to provide a side lobe suppressor which will operate effectively to allow the characteristic response of an accompanying matched filter to pass through the system even when the input signal is buried in noise.

Other objects and many of the attendant advantages of this invention will be readily appreciated as the same becomes better understood by reference to the following detailed description when considered in connection with the accompanying drawings wherein.

Figure 1:
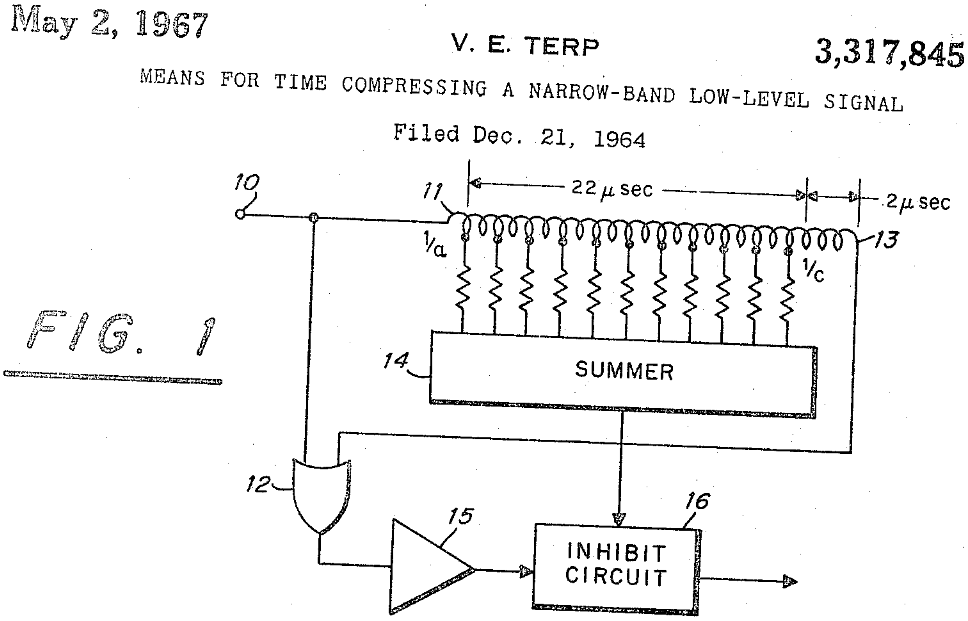
FIG. 1 illustrates a preferred embodiment of the invention.

In the specific embodiment of FIG. 1, an input signal is coupled from an input terminal 10 to the input of a delay line 11. In the example shown, a 22 microsecond delay line is chosen and the delay line has multiple output taps 11*a* through 11*k*. Each of the output taps is coupled through a resistor to the input of a summer 14 which may be, in actuality, a multiple input AND gate. Also connected in series with the output of the matched filter 11 is a 2 microsecond increment delay line 13. The two microseconds correspond to the pulse length of an increment pulse of the signal to be treated in the matched filter.

Another connection is taken from input 10 as one input to an OR gate 12 and the terminus end of delay increment 13 is also coupled as another input to OR gate 12. The output of OR gate 12 is coupled through an amplifier

15 as an inhibit input to inhibit circuit 16. The output of the summer 14 is also connected as an input to the inhibit circuit 16 and the output of the inhibit circuit may be utilized, for instance, in a radar display.

In operation, a signal comprising a long-duration narrow-band pulse is coupled from input 10 to the delay line 11 and as one input to the OR gate 12. As previously stated, in the present example a 22 microsecond delay line is used which has the 2 microsecond extension 13 as shown. The input signal length is also 22 microseconds and is matched to the length of delay line 11.

Figure 2:
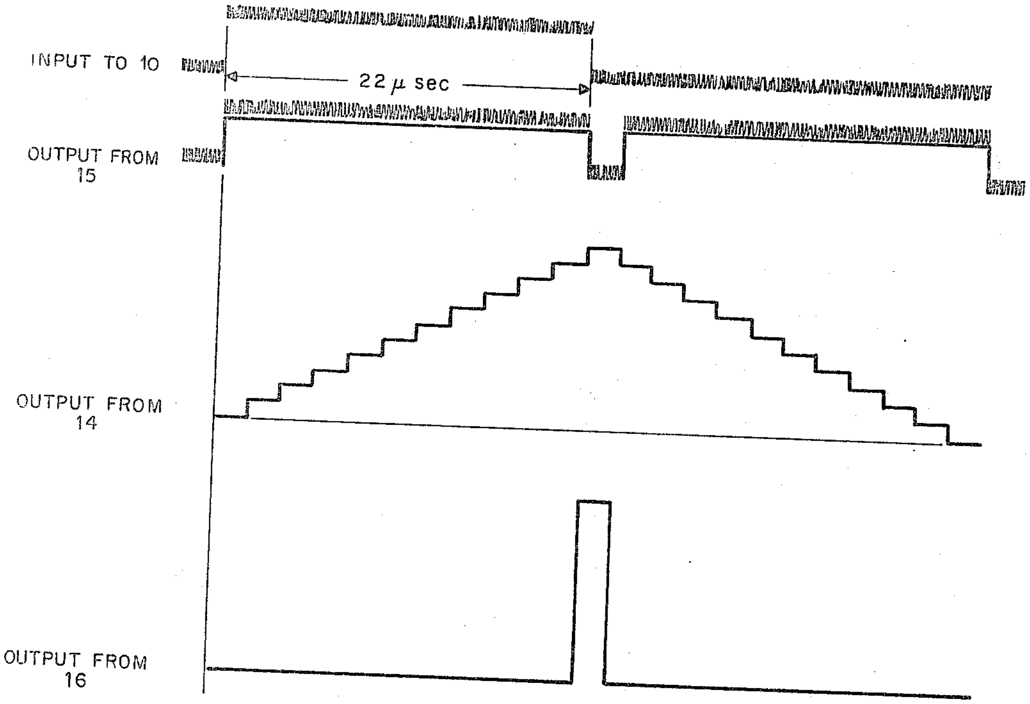
FIG. 2 illustrates waveforms at various points in the invention.

The object is to compress the long-duration narrow-band pulse to a short-duration broad-band pulse for display on a Plan Position Indicator tube accompanying a radar display. In addition, it is assumed in the present case that the signal level exceeds the average noise level for side lobe suppression. This is illustrated in FIG. 2 on the line labeled "input to 10." However, the system will operate, i.e., will sum the input waveform, even though the signal is buried in noise as will be explained later.

As the signal reaches the input of the OR gate 12 it is coupled through to the input of the amplifier 15. Amplifier 15 has a threshold level control which is set to the ambient noise level. Therefore, if the input signal does not exceed the ambient noise level set in the amplifier 15 there will be no output to act as an inhibit to the inhibit circuit 16. Therefore, if a signal is buried in noise, i.e., does not exceed the noise level set in amplifier 15, there will be a characteristic response from the delay line "output from 16" in FIG. 2, which will be coupled through the inhibit circuit 16 and will appear on the radar display.

However, if the signal level does exceed the noise level set in the amplifier 15 the input signal will be passed through the OR gate 12 and amplifier 15 and will function as an inhibit to inhibit circuit 16. As the signal travels down the delay line 11 and is finally loaded completely in the delay line 11 the signal disappears at the input of the OR gate and the characteristic response of the matched filter is coupled through inhibit circuit 16 as a single pulse. This would correspond to line labeled "output from 16." There is a 2 microsecond delay coupled between the end of the matched filter and the delay line segment 13 to allow the system to function properly, that is, pass the impulse response through the inhibit circuit 16. Once the signal has moved through the 2 microsecond delay there will be another input coupled through OR gate 12 and amplifier 15 to the input of the inhibit circuit 16 which will function to inhibit the output of the summer 14. This inhibit pulse will be effective until the input signal is completely out of the matched filter and delay line segment 13.

Through the use of the circuit of FIG. 1, whenever the signal exceeds the noise level as set in the amplifier 15, the circuit will be effective to suppress the side lobes on either side of the characteristic response lobe of a matched filter. Therefore, resolution on a radar display will be enhanced due to the fact that only a single lobe will appear rather than a characteristic stairstep response, i.e., main lobe with accompanying side lobes.

Obviously many modifications and variations of the present invention are possible in the light of the above teachings. It is therefore to be understood that within the scope of the appended claims the invention may be practiced otherwise than as specifically described.

What is claimed is:

1. Apparatus for producing a single wide-band high-level pulse of short duration in response to a low-level narrow-band signal of long duration comprising:

an input terminal for receiving signals to be processed, said signals having some fixed time duration, delay means having a total delay time equal to said time duration of said signals to be processed,
said delay means having an input connected to receive singals at said input terminal,
said delay means having a plurality of outputs with each of said outputs being displaced from adjacent ones by equal time increments,
a summer connected to said plurality of delay means outputs and arranged to produce an output signal indicative of the instantaneous sum of signals present at said delay means outputs,
gating means having first and second inputs and an output and being arranged to pass signals at its first input to its output when no signals are present at its second input,
said gating means being arranged to prevent signals from passing from its first input to its output when a signal is present at its second input,
an OR gate having first and second inputs and an output and arranged to produce a signal at its output when signals are present at either of its inputs,
said first OR gate input being connected to said input terminal,
said second OR gate input being serially connected to the most time delayed output of said delay means through an additional incremental delay means, and an amplifier, connected between said OR gate output and said gating means second input and adapted to pass only signals having a magnitude equal to or greater than the expected minimum magnitude of signals to be processed.
whereby receipt of signals having sufficient magnitude and proper time duration at said input terminal will cause said gating means to produce a high level short duration pulse indicative of same.

2. The apparatus of claim 1 wherein said delay means comprises a delay line having a plurality of equal spaced taps,
said taps comprising said plurality of outputs of said delay means.

References Cited by the Examiner

UNITED STATES PATENTS

| | | | |
|---|---|---|---|
| 2,951,988 | 9/1960 | Harlan et al. | 328—94 X |
| 3,124,707 | 3/1964 | Thomasson | 333—70 X |
| 3,155,912 | 11/1964 | Applebaum | 328—165 X |
| 3,157,838 | 11/1964 | Glaser | 328—165 X |
| 3,206,687 | 9/1965 | DiToro | 328—94 X |
| 3,252,093 | 5/1966 | Lerner | 325—42 |

ARTHUR GAUSS, *Primary Examiner.*

J. JORDAN, *Assistant Examiner.*